United States Patent [19]
Fujita et al.

[11] Patent Number: 5,373,532
[45] Date of Patent: Dec. 13, 1994

[54] π/4 QUADRATURE PHASE SHIFT KEYING MODULATOR

[75] Inventors: Hiroshi Fujita; Yoshifumi Toda, both of Kawasaki, Japan

[73] Assignee: Fujitsu Limited, Kawasaki, Japan

[21] Appl. No.: 943,479

[22] Filed: Sep. 11, 1992

[51] Int. Cl.$^5$ .............................. H04L 27/20
[52] U.S. Cl. ........................ 375/67; 375/54; 375/57; 375/60; 332/103
[58] Field of Search ........... 375/52, 53, 54, 57, 375/59, 67, 60; 332/103; 370/77, 58.1; 455/23

[56] References Cited

U.S. PATENT DOCUMENTS

| | | | |
|---|---|---|---|
| 4,483,000 | 11/1984 | Yamamoto et al. | 370/104 |
| 4,644,531 | 2/1987 | Sasaki | 370/77 |
| 4,962,510 | 10/1990 | McDavid et al. | 375/67 |
| 5,210,775 | 5/1993 | Takahara et al. | 375/67 |
| 5,222,104 | 6/1993 | Medendorp | 375/67 |

FOREIGN PATENT DOCUMENTS 63-47179 9/1988 Japan.
2-298139 12/1990 Japan.

*Primary Examiner*—Stephen Chin
*Assistant Examiner*—Don Vo
*Attorney, Agent, or Firm*—Staas & Halsey

[57] ABSTRACT

A π/4 shift QPSK modulator includes a pre-processing part for subjecting an input transmitting code sequece to a pre-processing, a modulator part for selectively subjecting the transmitting code sequence received via the pre-processing part to a modulation in conformance with QPSK and a modulation in conformance with a π/4 shift QPSK, and an output part for outputting a modulated signal having a burst form based on an output of the modulator part depending on a burst signal having leading and trailing edges, where the pre-processing part carries out the pre-processing so that I-axis and Q-axis data supplied to the modulator part have the same symbol in succession at parts corresponding to the leading and trailing edges of the burst signal, so as to suppress generation of unwanted waves in the output part.

9 Claims, 6 Drawing Sheets

FIG. 1A
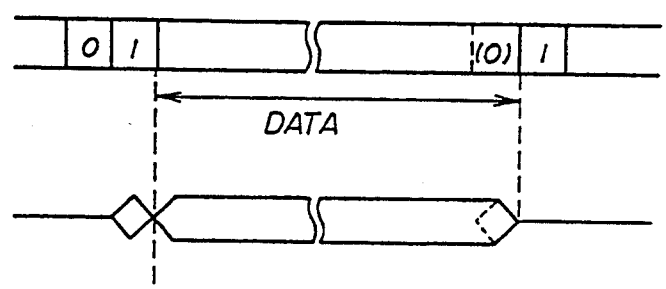
FIG. 1B
FIG. 1C
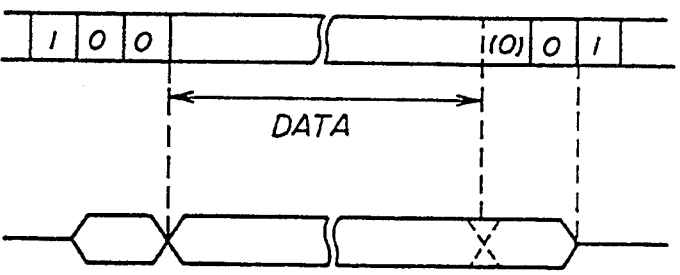
FIG. 1D

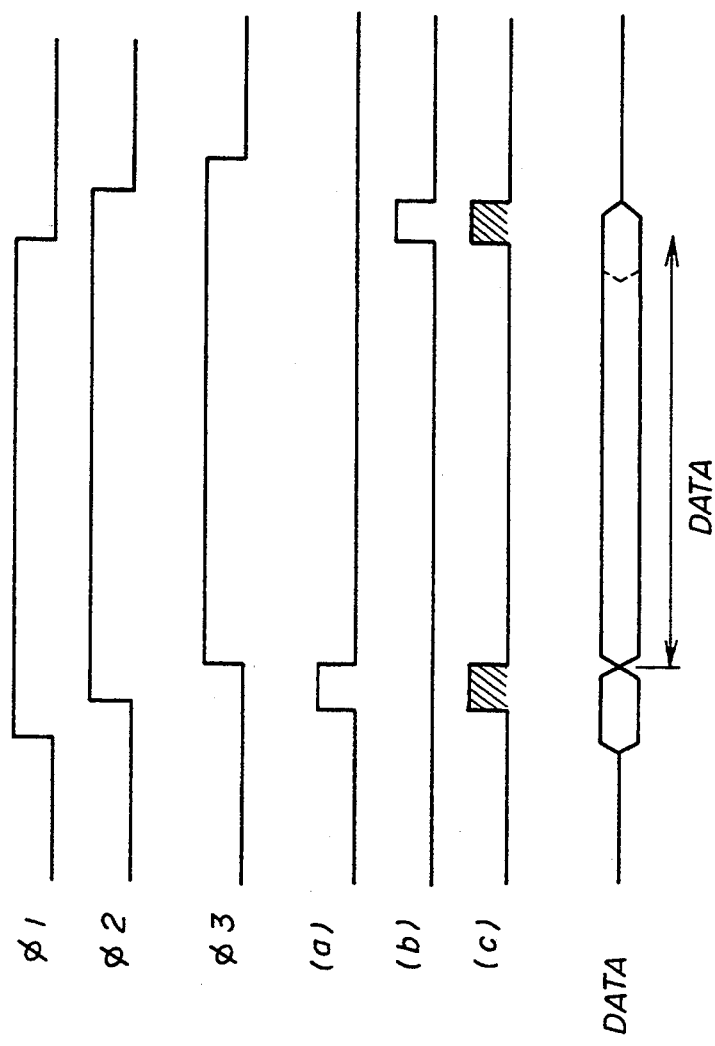

π/4 QUADRATURE PHASE SHIFT KEYING MODULATOR

BACKGROUND OF THE INVENTION

The present invention generally relates to modulators, and more particularly to a π/4 shift quadrature phase shift keying (QPSK) modulator which suppresses generation of unwanted waves which interfere other communications when making a burst transmission.

In a radio communication system using a phase modulation or amplitude phase modulation, there is a problem in that unwanted waves are generated at leading and trailing edges of the burst when transmitting the burst from the transmitting side using the time division multiplexing (TDM) and that the unwanted waves interfere other communications. Accordingly, a method of solving this problem was previously proposed in a Japanese Published Patent Application No.63-47179.

According to this previously proposed method, the phase at the leading and trailing edges of the burst is always shifted by 180°, that is, from π to 0 or from 0 to π, in order to prevent the generation of the unwanted waves. As shown in FIG. 1 (a), a modulator input signal is changed from 0 to 1 at the leading edge and is changed from 0 to 1 at the trailing edge, for example, and a burst signal is turned ON/OFF at the transition point. The amplitude of the demodulator output signal is zero at the zero crossing thereof as shown in FIG. 1 (b), and thus, a considerable amount of the unwanted waves can be suppressed if the switching of the burst signal is made at the zero crossing.

However, according to the method of FIG. 1 (a), the unwanted waves remain in the burst spectrum for the 0/π modulation as indicated by a dotted line in FIG. 2. Hence, bits are added as shown in FIG. 1 (c) so that the data signal does not change by two or more symbols at the leading and trailing edges of the burst signal. In this case, the bits "100" are added at the leading edge of the burst signal to turn the burst signal ON at the transition point from 1 to 0, and the bits "001" are added at the trailing edge of the burst signal to turn the burst signal OFF at the transition point from 0 to 1. By taking these measures, the spectrum of the unwanted waves shift towards the center frequency as indicated by a one-dot chain line in FIG. 2 and it is possible to further reduce the unwanted waves outside the band.

According to the above described method, it is necessary to add the bits which do not change by two or more symbols at the leading and trailing edges of the burst signal. A phase modulator generally uses a differential logic circuit, and such a differential logic circuit always generates an output which is inverted with respect to the previous bit when "1" is input and generates the same output as the previous bit when "0" is input. Hence, the same data can easily made to continue for two symbols by setting the input of the differential logic circuit to (0, 0). Recently, a π/4 shift QPSK have been developed to improve the characteristic of the phase modulation system against distortion. According to this π/4 shift QPSK, the signal point arrangement of the QPSK and the signal point arrangement which is shifted by π/4 from that of the QPSK are alternately used to carry out a 4-phase phase modulation. FIG. 3 shows an example of a general signal point arrangement of the π/4 shift QPSK. As shown in FIG. 3, a signal point arrangement indicated by a mark "●" is used at a certain timing, and a signal point arrangement indicated by a mark "x" and shifted by π/4 from the certain timing is used at a next timing, and such signal point arrangements are alternately used in a repeated manner to carry out the 4-phase phase modulation. As a result, the characteristic of the phase modulation system against the distortion is improved. According to the π/4 shift QPSK, the signal point data take five values.

However, the above described method of suppressing the unwanted waves by making the same data continue for two or more symbols at the leading and trailing edges of the burst signal cannot be applied to the π/4 shift QPSK. In other words, because the signal point arrangement according to the π/4 shift QPSK is always shifted by π/4 at each timing, the same data cannot be made to continue for two or more symbols by merely making the input of the differential logic circuit (0, 0).

Therefore, there is a demand to realize a π/4 shift QPSK in which the unwanted waves can be suppressed as in the case of the above described method, while improving the characteristic of the phase modulation system against the distortion.

SUMMARY OF THE INVENTION

Accordingly, it is a general object of the present invention to provide a novel and useful π/4 shift QPSK modulator in which the problem described above is eliminated and the above described demand is satisfied.

Another and more specific object of the present invention to provide a novel and useful π/4 shift QPSK modulator comprising pre-processing means for subjecting an input transmitting code sequence to a pre-processing, modulator means, coupled to the pre-processing means, for selectively subjecting the transmitting code sequence received via the pre-processing means to a modulation in conformance with QPSK and a modulation in conformance with a π/4 shift QPSK, and output means, coupled to the modulator means, for outputting a modulated signal having a burst form based on an output of the modulator means depending on a burst signal having leading and trailing edges, where the pre-processing means carries out the pre-processing so that I-axis and Q-axis data supplied to the modulator means have the same symbol in succession at parts corresponding to the leading and trailing edges of the burst signal, so as to suppress generation of unwanted waves in the output means. According to the π/4 shift QPSK modulator of the present invention, it is possible to obtain the desirable effects of the π/4 shift QPSK while suppressing the generation of the unwanted waves at the time of the burst transmission. Further, it is possible to make the same symbol continues at the leading and trailing edges of the burst signal using a simple circuit.

Other objects and further features of the present invention will be apparent from the following detailed description when read in conjunction with the accompanying drawings.

BRIEF DESCRIPTION OF THE DRAWINGS

FIGS. 1a–1d are diagrams for explaining a method of suppressing unwanted waves at the time of a burst transmission;

FIG. 7 is a time chart for explaining the timing of signals at various parts of the logic circuit.

DESCRIPTION OF THE PREFERRED EMBODIMENTS

Figure 4:
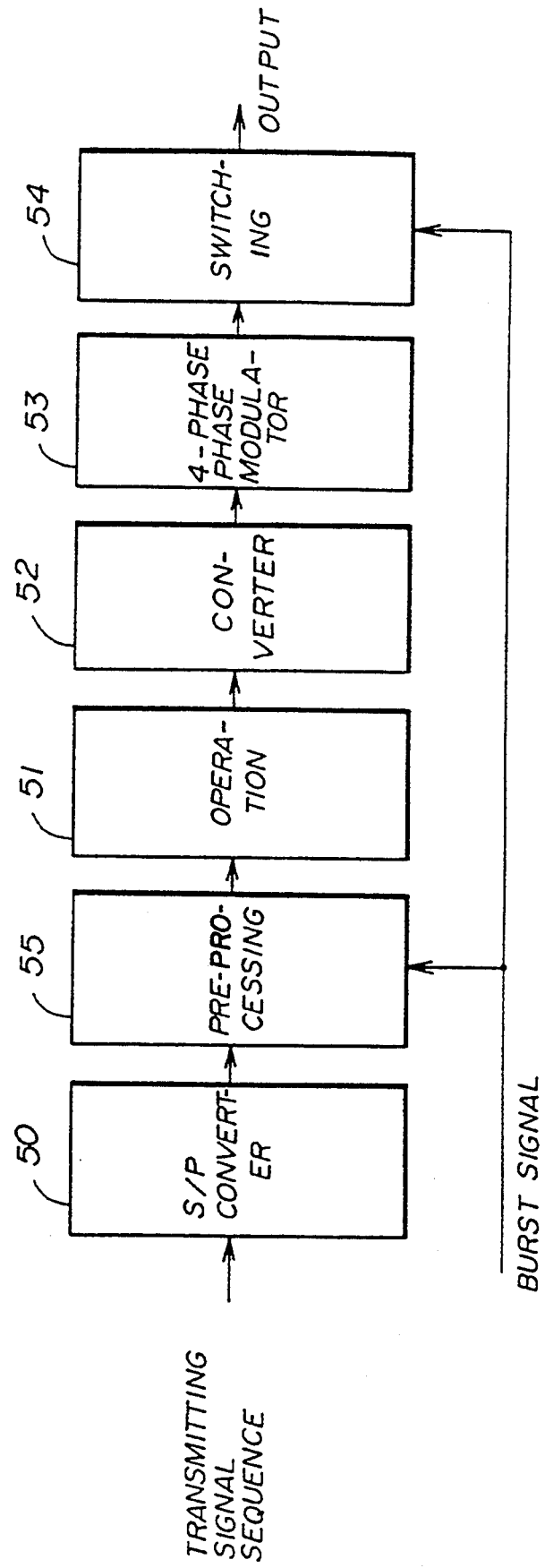
FIG. 4 is a system block diagram for explaining the operating principle of the present invention.

First, a description will be given of the operating principle of the present invention, by referring to FIG. 4. FIG. 4 shows an essential part of a π/4 shift QPSK modulator according to the present invention.

In FIG. 4, the π/4 shift QPSK modulator includes a serial-parallel (S/P) converter part 50, a pre-processing part 55, an operation part 51, a converter part 52, a 4-phase phase modulator part 53, and a switching part 54 which are coupled as shown. The S/P converter part 50 converts a transmitting code sequence into parallel transmitting codes predetermined amounts at a time. The operation part 51 obtains I-axis and Q-axis data of a signal point arrangement at a present timing which is shifted by π/4 from a signal point arrangement of one timing before, based on the transmitting codes from the S/P converter part 50 and the I-axis and Q-axis data of the signal point arrangement at the one timing before. The converter part 52 converts the I-axis and Q-axis data of the present timing which are obtained from the operation part 51 into analog base band modulating signals of I-channel and Q-channel. The 4-phase phase modulator part 53 subjects the I-channel and Q-channel base band modulating signals from the converter part 52 to a 4-phase phase modulation. The switching part 54 generates a burst signal by turning ON/OFF the output of the 4-phase phase modulator part 53. The pre-processing part 55 subjects the transmitting codes supplied to the operation part 51 to a pre-processing so that the values of the I-axis and Q-axis data generated in the operation part 51 are converted to values such that the same symbol continues at the leading and trailing edges of the burst signal.

The operation part 51 obtains the signal point arrangement of the present timing according to a Table 4 which will be described later. On the other hand, the pre-processing part 55 carries out a pre-processing such that a transmitting code ($X_K$, $Y_K$) is (0, 0) when an odd/even judging signal OE in Table 4 is "1" and the transmitting code ($X_K$, $Y_K$) is (1, 0) when the odd/even judging signal OE in Table 4 is "0".

In Table 4, ($X_K$, $Y_K$) denotes the transmitting code, ($I_K$, $Q_K$) denotes the I-axis and Q-axis data of the present timing, (*$I_K$, *$Q_K$) denotes inverted data of ($I_K$, $Q_K$), ($I_{K-1}$, $Q_{K-1}$) denotes the I-axis and Q-axis data of the previous timing, (*$I_{K-1}$*$Q_{K-1}$) denotes inverted data of ($I_{K-1}$, $Q_{K-1}$), and OE denotes the odd/even judging signal which indicates the side on which the signal point arrangement is located. The odd/even judging signal OE is "1" in the normal signal point arrangement, and is "0" in the π/4 shift signal point arrangement.

The pre-processing part 55 may be made up of a circuit for detecting the leading edge timing and the trailing edge timing of the burst signal, and a logic operation circuit which carries out a logic operation to convert the transmitting code ($X_K$, $Y_K$) into a value such that the I-axis and Q-axis data continue the same bit based on the odd/even judging signal OE with the timings of the leading and trailing edges of the burst signal.

The pre-processing part 55 converts the transmitting code which is input to the operation part 51 into a value such that the I-axis and Q-axis data generated in the operation part 51 continue the same symbol at the leading and trailing edges of the burst signal. Accordingly, the same symbol continues at the leading and trailing edges of the burst signal which is finally transmitted in the burst signal. The switching part 54 turns the transmitting signal ON/OFF with the timings of the signal transition points at the leading and trailing edges of the burst signal, so as to suppress the generation of unwanted waves.

Next, a description will be given of an embodiment of the π/4 shift QPSK modulator according to the present invention, by referring to FIG. 5.

Figure 5:
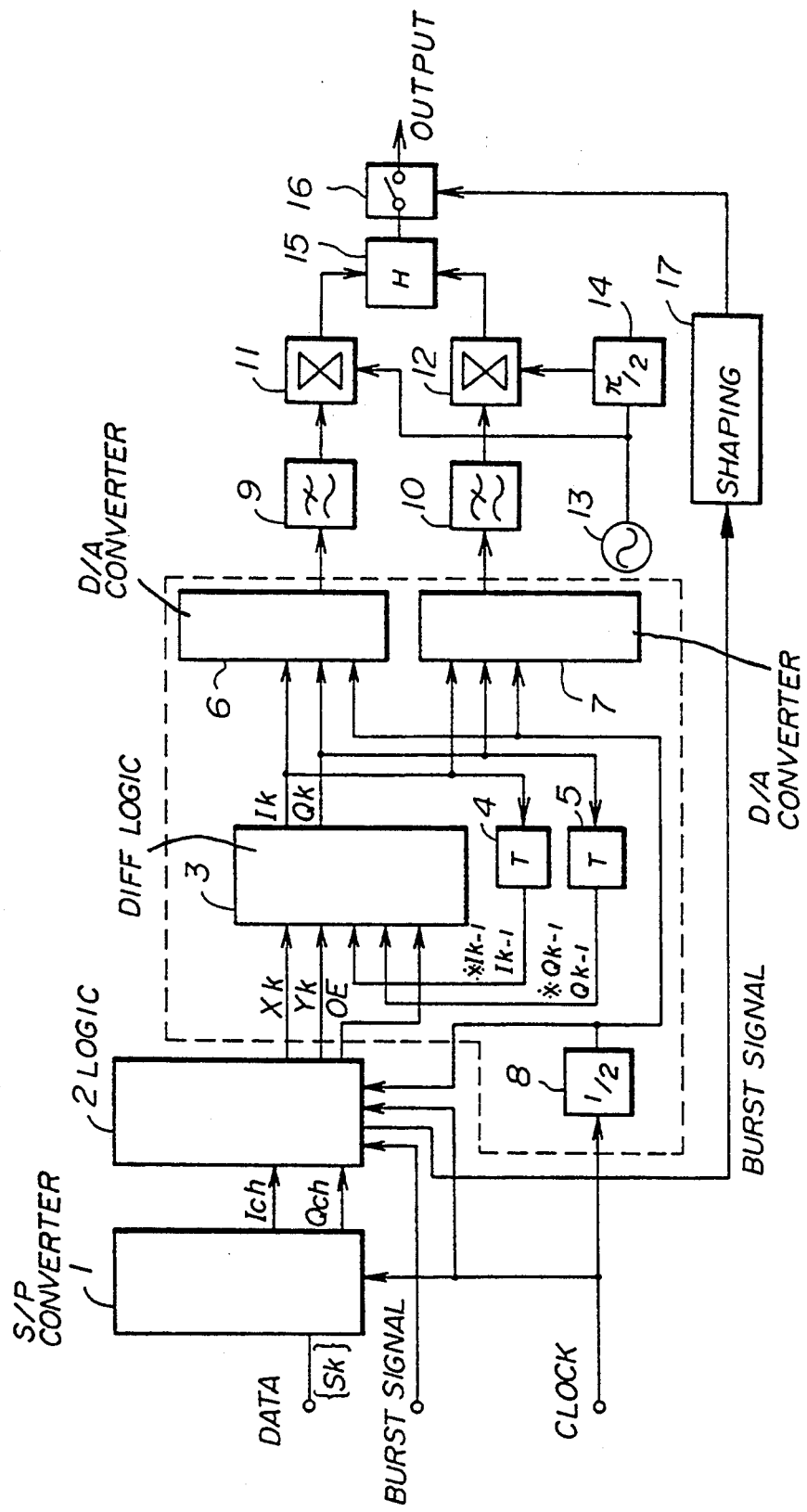
FIG. 5 is a system block diagram showing an embodiment of a π/4 shift QPSK modulator according to the present invention.

In FIG. 5, a serial-parallel (S/P) converter 1 subjects an input transmitting code sequence {$S_K$} to a serial-parallel conversion 2 bits at a time and outputs a transmitting code ($X_K$, $Y_K$). A logic circuit 2 forms a part of a pre-processing part, and a description of this logic circuit 2 will be given later. The logic circuit 2 carries out a process such that the same bit continues for two bits at the leading and trailing edges of the burst signal.

A differential logic circuit 3 is provided to make a π/4 shift 4-phase modulation. This differential logic circuit 3 carries out a differential logic operation of the π/4 shift 4-phase modulation on the transmitting code ($X_K$, $Y_K$), the I-axis and Q-axis data ($I_{K-1}$, $Q_{K-1}$) of the previous timing, the inverted data (*$I_{K-1}$, *$Q_{K-1}$) of ($I_{K-1}$, $Q_{K-1}$) and the odd/even judging signal OE, and generates I-axis and Q-axis data ($I_K$, $Q_K$) of the signal point of the present timing, where "*" denotes a logical NOT or inversion which will be used throughout this specification. As will be described later in more detail, the differential logic circuit 3 may be formed by a circuit which uses selectors, but it is also possible to form the differential logic circuit 3 by a logic integrated circuit (IC) which is made up of logic elements for carrying out logical operations.

Delay circuits 4 and 5 are respectively made up of a flip-flop. The delay circuit 4 delays the I-axis data $I_K$ output from the differential logic circuit 3 by one timing and generates the I-axis data $I_{K-1}$ of the previous timing and the inverted data *$I_{K-1}$ thereof. The delay circuit 5 delays the Q-axis data $Q_K$ output from the differential logic circuit 3 by one timing and generates the Q-axis data $Q_{K-1}$ of the previous timing and the inverted data *$Q_{K-1}$ thereof. The I-axis data $I_{K-1}$ and *$I_{K-1}$ output from the delay circuit 4 and the Q-axis data $Q_{K-1}$ and *$Q_{K-1}$ output from the delay circuit 5 are respectively fed back to the input side of the differential logic circuit 3. A frequency divider 8 divides the frequency of a timing clock by 2, and generates the odd/even judging signal OE which indicates the side on which the signal point arrangement is located. This odd/even judging signal OE is supplied to the logic circuit 2, the differential logic circuit 3, and a digital-to-analog (D/A) converters 6 and 7.

Figure 2:
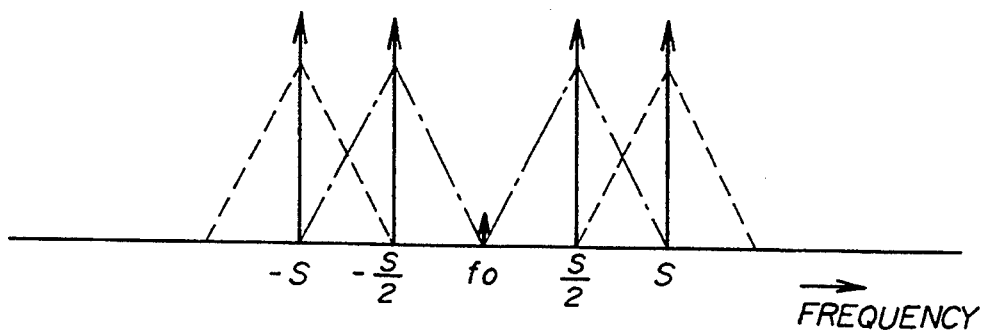
FIG. 2 shows a spectrum of the unwanted waves which are generated at the time of the burst transmission.
Figure 3:
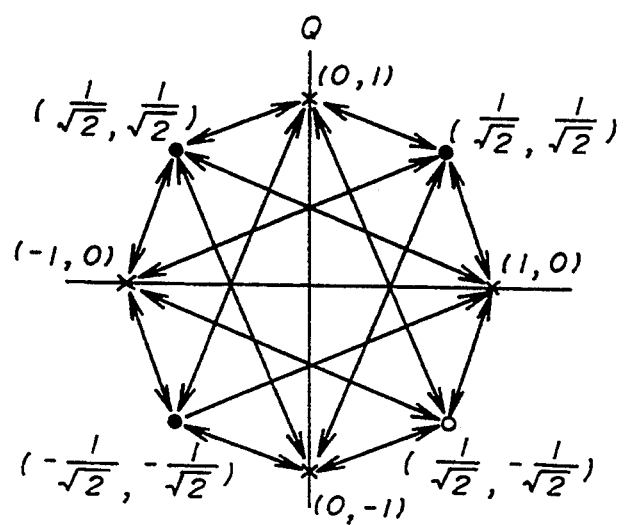
FIG. 3 is a diagram for explaining a signal point arrangement of a π/4 shift QPSK.

The D/A converters 6 and 7 respectively convert the signal point data ($I_K$, $Q_K$) into analog baseband modulating signals of the I-channel and Q-channel having the five values shown in FIG. 3.

Bandpass filters 9 and 10 respectively limit the bands of the outputs of the D/A converters 6 and 7. An oscillator 13 generates a carrier wave, and a $\pi/2$ phase shifter 14 shifts the phase of the carrier wave output from the oscillator 13 by $\pi/2$. Ring modulators 11 and 12 respectively module the carrier wave from the oscillator 13 by the base band modulating signals from the bandpass filters 9 and 10. A synthesizing circuit 15 synthesizes the outputs of the ring modulators 11 and 12, and obtains a $\pi/4$ shift QPSK signal. A shaping circuit 17 shapes the waveform of the burst signal, and a switching circuit 16 turns the $\pi/4$ shift QPSK signal from the synthesizing circuit 15 ON/OFF by the shaped burst signal which is output from the shaping circuit 17.

Figure 6:
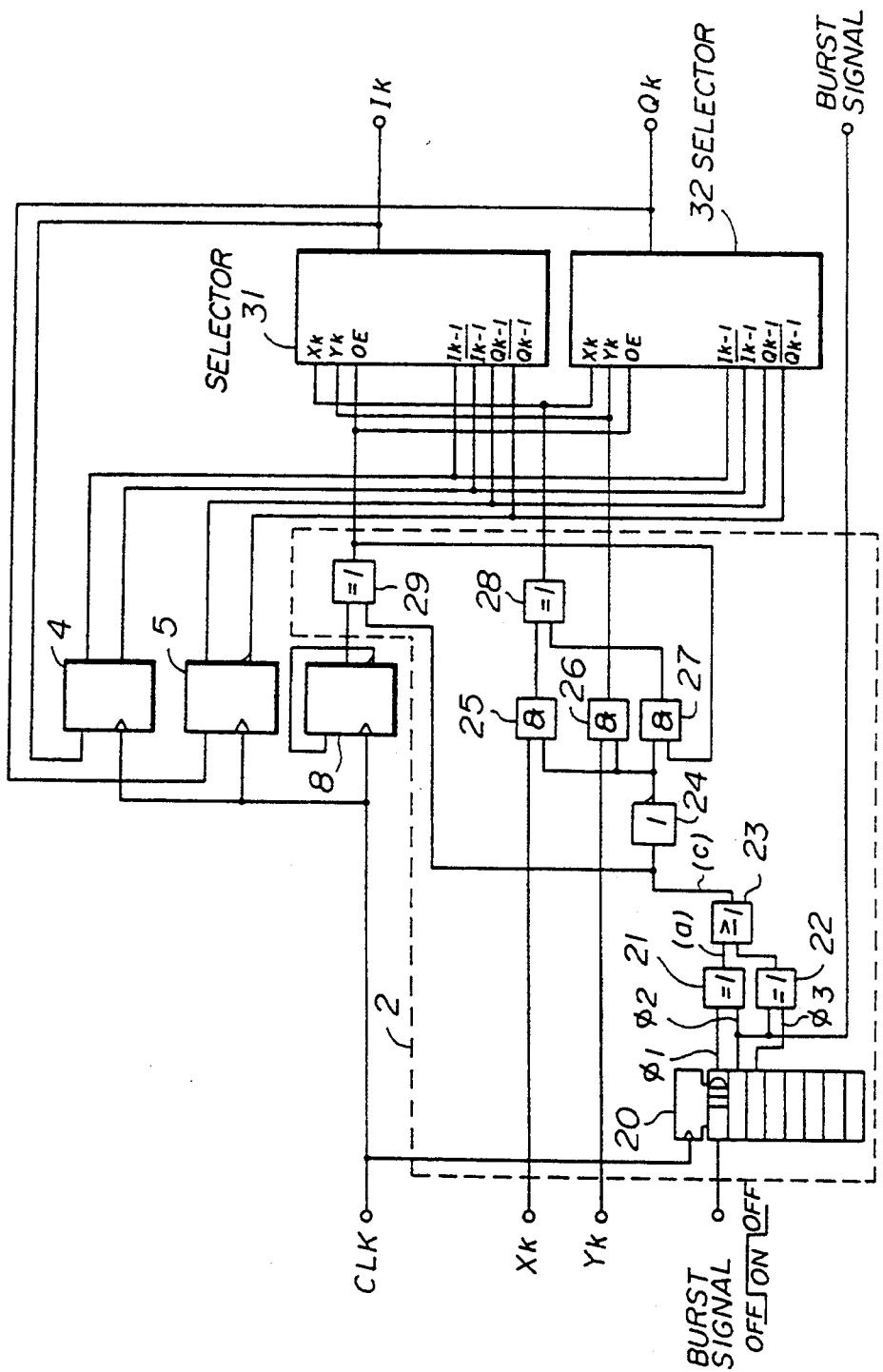
FIG. 6 is a system block diagram showing the circuit construction of a circuit part including a logic circuit and a differential logic circuit of the embodiment shown in FIG. 5.

FIG. 6 shows the circuit construction of a circuit part including the logic circuit 2 and the differential logic circuit 3 of the embodiment shown in FIG. 5. In FIG. 6, those parts which are the same as those corresponding parts in FIG. 5 are designated by the same reference numerals, and a description thereof will be omitted.

In FIG. 6, selectors 31 and 32 form the differential logic circuit 3, and the logic circuit 2 is formed by circuit elements surrounded by a dotted line. The delay circuit 4 generates the I-axis data $I_{K-1}$ of the previous timing and the inverted data $*I_{K-1}$ thereof based on the I-axis data $I_K$ of the present timing. The delay circuit 5 generates the Q-axis data $Q_{K-1}$ of the previous timing and the inverted data $*Q_{K-1}$ thereof based on the Q-axis data $Q_K$ of the present timing. The data $I_{K-1}$, $*I_{K-1}$, $Q_{K-1}$ and $*Q_{K-1}$ output from the delay circuits 4 and 5 are supplied to the selectors 31 and 32. The selectors 31 and 32 also receive the odd/even judging signal OE which is output from the frequency divider 8 and the transmitting code ($X_K$, $Y_K$) which is obtained via the logic circuit 2. The selectors 31 and 32 respectively select and output one of the data $I_{K-1}$, $*I_{K-1}$, $Q_{K-1}$ and $*Q_{K-1}$ using the transmitting code ($X_K$, $Y_K$) and the odd/even judging signal OE as selection signals.

The logic circuit 2 includes a shift register 20, exclusive-OR circuits 21 and 22, an OR circuit 23, an inverter 24, AND circuits 25, 26 and 27, and exclusive-OR circuits 28 and 29 which are connected as shown. The shift register 20 generates outputs $\phi 1$, $\phi 2$ and $\phi 3$ by successively delaying the burst signal. The exclusive-OR circuit 21 obtains an exclusive-OR of the outputs $\phi 1$ and $\phi 2$ of the shift register 20. On the other hand, the exclusive-OR circuit 22 obtains an exclusive-OR of the outputs $\phi 2$ and $\phi 3$ of the shift register 20. The OR circuit 23 obtains an OR of output signals (a) and (b) of the exclusive-OR circuits 21 and 22. The exclusive-OR circuit 29 obtains an exclusive-OR of the odd/even judging signal OE from the frequency divider 8 and an output signal (c) of the OR circuit 23. The inverter 24 inverts the output signal (c) of the OR circuit 23. The AND circuit 25 obtains an AND of the output signal of the inverter 24 and the transmitting code $X_K$, and the AND circuit 26 obtains an AND of the output signal of the inverter 24 and the transmitting code $Y_K$. Further, the AND circuit 27 obtains an AND of the output signal of the inverter 24 and the output signal of the exclusive-OR circuit 29. The exclusive-OR circuit 28 obtains an exclusive-OR of an output signal of the AND circuit 25 and an output signal of the AND circuit 27.

The differential logic of this embodiment of the $\pi/4$ shift QPSK modulator can be described by the following formulas, where $F(X_K, Y_K)$ can be described by Table 1.

$$I_K = I_{K-1}\cos[F(X_K, Y_K)] - Q_{K-1}\sin[F(X_K, Y_K)]$$
$$Q_K = I_{K-1}\sin[F(X_K, Y_K)] - Q_{K-1}\cos[F(X_K, Y_K)]$$

TABLE 1

| $X_K$ | $Y_K$ | $F(X_K, Y_K) = \theta_K$ |
| --- | --- | --- |
| 0 | 0 | $+\pi/4$ |
| 0 | 1 | $+3\pi/4$ |
| 1 | 1 | $-3\pi/4$ |
| 1 | 0 | $-\pi/4$ |

The above described logic can be described by a truth table of Table 2.

TABLE 2

| | ($X_K$, $Y_K$) | | | | | | | |
| --- | --- | --- | --- | --- | --- | --- | --- | --- |
| | $+\pi/4$ | | $3\pi/4$ | | $-3\pi/4$ | | $-\pi/4$ | |
| ($I_{K-1}$, $Q_{K-1}$) | 0 | 0 | 0 | 1 | 1 | 1 | 1 | 0 |
| (A) 1    0 | $1/\sqrt{2}$ | $1/\sqrt{2}$ | $-1/\sqrt{2}$ | $1/\sqrt{2}$ | $-1/\sqrt{2}$ | $-1/\sqrt{2}$ | $1/\sqrt{2}$ | $-1/\sqrt{2}$ |
| 0    1 | $-1/\sqrt{2}$ | $1/\sqrt{2}$ | $-1/\sqrt{2}$ | $-1/\sqrt{2}$ | $1/\sqrt{2}$ | $-1/\sqrt{2}$ | $1/\sqrt{2}$ | $1/\sqrt{2}$ |
| $-1$    0 | $-1/\sqrt{2}$ | $-1/\sqrt{2}$ | $1/\sqrt{2}$ | $-1/\sqrt{2}$ | $1/\sqrt{2}$ | $1/\sqrt{2}$ | $-1/\sqrt{2}$ | $1/\sqrt{2}$ |
| 0   $-1$ | $1/\sqrt{2}$ | $-1/\sqrt{2}$ | $1/\sqrt{2}$ | $1/\sqrt{2}$ | $-1/\sqrt{2}$ | $1/\sqrt{2}$ | $-1/\sqrt{2}$ | $-1/\sqrt{2}$ |
| (B) $1/\sqrt{2}$   $1/\sqrt{2}$ | 0 | 1 | $-1$ | 0 | 0 | $-1$ | 1 | 0 |
| $-1/\sqrt{2}$   $1/\sqrt{2}$ | $-1$ | 0 | 0 | $-1$ | 1 | 0 | 0 | 1 |
| $-1/\sqrt{2}$   $-1/\sqrt{2}$ | 0 | $-1$ | 1 | 0 | 0 | 1 | $-1$ | 0 |
| $1/\sqrt{2}$   $-1/\sqrt{2}$ | 1 | 0 | 0 | 1 | $-1$ | 0 | 0 | $-1$ |

In Table 2, parts indicated by (A) and (B) are alternately used. If the odd/even judging signal OE is assumed to be "1" for an even numbered occurrence (A) and "0" for an odd numbered occurrence (B), a truth table of Table 3 is obtained when Table 2 is converted using the following conversion rule. In the truth table of Table 3, the input to the differential logic circuit 3 is described by "1" or "0".

| Conversion Rule: | |
| --- | --- |
| ($I_{ch}$, $Q_{ch}$) | $\longrightarrow$ (*OE, $I_K$, $Q_K$) |
| (1, 0) | $\longrightarrow$ (0, 1, 1) |
| (0, 1) | $\longrightarrow$ (0, 0, 1) |

-continued

Conversion Rule:

$(-1, 0) \longrightarrow (0, 0, 0)$ $(0, 1) \longrightarrow (0, 1, 0)$ $(1/\sqrt{2}, 1/\sqrt{2}) \longrightarrow (1, 1, 1)$ $(-1/\sqrt{2}, 1/\sqrt{2}) \longrightarrow (1, 0, 1)$ $(-1/\sqrt{2}, -1/\sqrt{2}) \longrightarrow (1, 0, 0)$ $(1/\sqrt{2}, -1/\sqrt{2}) \longrightarrow (1, 1, 0)$

TABLE 3

| $(X_K, Y_K)$ | $+\pi/4$ | | $3\pi/4$ | | $-3\pi/4$ | | $-\pi/4$ | |
|---|---|---|---|---|---|---|---|---|
| $(OE, I_{K-1}, Q_{K-1})$ | 0 | 0 | 0 | 1 | 1 | 1 | 1 | 0 |
| 0 | 11 | 1 | 11 | 1 | 01 | 1 | 00 | 1 | 10 |
| 0 | 01 | 1 | 01 | 1 | 00 | 1 | 10 | 1 | 11 |
| 0 | 00 | 1 | 00 | 1 | 10 | 1 | 11 | 1 | 01 |
| 0 | 10 | 1 | 10 | 1 | 11 | 1 | 01 | 1 | 00 |
| 1 | 11 | 0 | 01 | 0 | 00 | 0 | 10 | 0 | 11 |
| 1 | 01 | 0 | 00 | 0 | 10 | 0 | 11 | 0 | 01 |
| 1 | 00 | 0 | 10 | 0 | 11 | 0 | 01 | 0 | 00 |
| 1 | 10 | 0 | 11 | 0 | 01 | 0 | 00 | 0 | 10 |

Further, the relationship shown in Table 3 can be described by a correlation described by a truth table of Table 4.

TABLE 4

| | $(X_K, Y_K)$ | | | |
|---|---|---|---|---|
| $(OE, I_{K-1}, Q_{K-1})$ | $+\pi/4$<br>0 0 | $3\pi/4$<br>0 1 | $-3\pi/4$<br>1 1 | $-\pi/4$<br>1 0 |
| $0\ I_{K-1} Q_{K-1}$ | $1, I_{K-1}, Q_{K-1}$ | $1, *Q_{K-1}, I_{K-1}$ | $1, *I_{K-1}*Q_{K-1}$ | $1, Q_{K-1}, *I_{K-1}$ |
| $1\ I_{K-1} Q_{K-1}$ | $0, *Q_{K-1}, I_{K-1}$ | $0, *I_{K-1}, *Q_{K-1}$ | $0, Q_{K-1}*I_{K-1}$ | $0, I_{K-1}, Q_{K-1}$ |

As may be seen from Table 4, the I-axis and Q-axis data ($I_K$, $Q_K$) of the present timing are uniquely determined by the I-axis and Q-axis data ($I_{K-1}$, $Q_{K-1}$) of one timing before and the transmitting code ($X_K$, $Y_K$). For example, if the I-axis and Q-axis data ($I_{K-1}$, $Q_{K-1}$) of one timing before relates to the data of an odd numbered occurrence (the odd/even judging signal OE=0), that is, if (OE, $I_{K-1}$, $Q_{K-1}$) is (0, $I_{K-1}$, $Q_{K-1}$), (1, $Q_{K-1}$, $*I_{K-1}$) is looked up as the data (OE, $I_K$, $Q_K$) of the present timing from the Table 4 when (1, 0) is input as the transmitting code ($X_K$, $Y_K$). Hence, in this case, the odd/even judging signal OE of the present timing becomes "1", the I-axis data $I_K$ of the present timing becomes equal to the Q-axis data $Q_{K-1}$ of the previous timing, and the Q-axis data $Q_K$ of the present timing becomes equal to the inverted I-axis data $*I_{K-1}$ of the previous timing.

This embodiment carries out the $\pi/4$ shift QPSK according to the above described principle. In other words, the input transmitting code sequence $\{S_K\}$ is subjected to the S/P conversion 2 bits at a time by the S/P converter circuit 1, and the transmitting code ($X_K$, $Y_K$) is generated. This transmitting code ($X_K$, $Y_K$) is input to the differential logic circuit 3 via the logic circuit 2.

The differential logic circuit 3 generates the I-axis and Q-axis data ($I_K$, $Q_K$) of the present timing according to the truth table of Table 4. The data ($I_K$, $Q_K$) are delayed by one timing in each of the delay circuits 4 and 5, and are fed back to the input side of the differential logic circuit 3 as the I-axis and Q-axis data ($I_{K-1}$, $Q_{K-1}$) of the previous timing and inverted data ($*I_{K-1}$, $*Q_{K-1}$) thereof. The differential logic circuit 3 is supplied with the odd/even judging signal OE for judging whether the signal point arrangement of the present timing is one of the even numbered occurrence or the odd numbered occurrence. Accordingly, the differential logic circuit 3 can carry out the logic operation and output the I-axis and Q-axis data ($I_K$, $Q_K$) of the present timing based on the signals input thereto and according to the truth table of Table 4.

The I-axis and Q-axis data ($I_K$, $Q_K$) of the present timing which are obtained in the above described manner are input to the D/A converters 6 and 7, and the data are converted in the bandpass filters 9 and 10 into the analog baseband modulating signals having the five values corresponding to each of the signal points. Thereafter, the normal 4-phase modulation is carried out in each of the ring modulators 11 and 12 and the outputs of the ring modulators 11 and 12 are synthesized by the synthesizing circuit 15. The switching circuit 16 turns ON/FF the output of the synthesizing circuit 15 with the timing of the burst signal, so as to transmit the data in the burst form.

Next, a description will be given of the operation of making the same bit continue for two symbols at the leading and trailing edges of the burst signal.

As may be readily understood from the truth table of Table 4, if the previous timing is the odd numbered occurrence and the data (OE, $I_{K-1}$, $Q_{K-1}$) of this previous timing is (0, $I_{K-1}$, $Q_{K-1}$), the data of the present timing becomes (1, $I_{K-1}$, $Q_{K-1}$) if the transmitting code ($X_K$, $Y_K$) input at the present timing is (0, 0). Hence, in this case, the I-axis data and the Q-axis data respectively have the same bit twice in succession. Similarly, if the previous timing is the even numbered occurrence and the data (OE, $I_{K-1}$, $Q_{K-1}$) of this previous timing is (1, $I_{K-1}$, $Q_{K-1}$), the data of the present timing becomes (0, $I_{K-1}$, $Q_{K-1}$) if the transmitting code ($X_K$, $Y_K$) input at the present timing is (1, 0). Also in this latter case, the I-axis data and the Q-axis data respectively have the same bit twice in succession.

Therefore, the same bit may be made to continue twice in succession at the odd numbered occurrence if the odd/even judging signal OE is changed from "0" to "1" and the transmitting code ($X_K$, $Y_K$) is fixed to (1, 0). Similarly, the same bit may be made to continue twice in succession at the even numbered occurrence if the odd/even judging signal OE is changed from "1" to "0" and the transmitting code ($X_K$, $Y_K$) is fixed to (0, 0).

In this embodiment, the logic circuit 2 carries out the above described operation. In other words, as shown in the time chart of FIG. 7, the shift register 20 obtains the signals $\phi 1$, $\phi 2$ and $\phi 3$ by successively delaying the burst signal. The exclusive-OR circuit 21 obtains the exclusive-OR of the signals $\phi 1$ and $\phi 2$ to output the signal (a) for controlling the leading edge of the burst signal. The exclusive-OR circuit 22 obtains the exclusive-OR of the signals $\phi 2$ and $\phi 3$ to output the signal (b) for controlling the trailing edge of the burst signal. In addition, the OR circuit 23 obtains the OR of the signals (a) and (b) to output the signal (c) for controlling the leading and trailing edges of the burst signal.

A circuit part of the subsequent stage including the circuits 24 through 29 changes the odd/even judging signal OE from "1" to "0", sets the transmitting code $X_K$ to "0" and sets the transmitting code $Y_K$ to "0" if the signal (c) is "1" and the odd/even judging signal OE is "1", so that the same bit of the I-axis and Q-axis data continue for two symbols. In addition, the circuit part of the subsequent stage changes the odd/even judging signal OE from "0" to "1", sets the transmitting code $X_K$ to "1" and sets the transmitting code $Y_K$ to "0" if the signal (c) is "1" and the odd/even judging signal OE is "0", so that the same bit of the I-axis and Q-axis data continue for two symbols.

By the above described operation, the same bit of the I-axis and Q-axis data respectively continue twice at the leading and trailing edges of the burst signal. The signal sequence which has such leading and trailing edges is input to the 4-phase phase modulator part of the next stage where the switching circuit 16 turns the $\pi/4$ shift QPSK signal ON/OFF with the timings shown in FIG. 1 (c) and (d), so as to suppress the generation of the unwanted waves and to make the the burst transmission.

The circuit construction of the logic circuit 2 is not limited to that of the described embodiment. The logic circuit 2 may have any circuit construction as long as it has the function of making the same data shown in Table 4 continue twice in succession, and for example, this function may be realized by use of a shift register and a selector. In addition, it is possible to provide delay elements in the logic circuit 2 to erase the pulse of the clock at the part where the same bit is to continue twice in succession.

Of course, the differential logic circuit 3 is also not limited to that of the described embodiment. The differential logic circuit 3 may have any circuit construction as long as the truth table of Table 4 can be realized.

Further, the present invention is not limited to these embodiments, but various variations and modifications may be made without departing from the scope of the present invention.

What is claimed is:

1. A $\pi/4$ shift quadrature phase shift keying modulator comprising:
   pre-processing means for subjecting an input transmitting code sequence to a pre-processing;
   modulator means, coupled to said pre-processing means, for alternately subjecting the transmitting code sequence received via said pre-processing means to a modulation in conformance with a quadrature phase shift keying and a modulation in conformance with a $\pi/4$ shift quadrature phase shift keying; and
   output means, coupled to said modulator means, for outputting a modulated signal in a form of a burst signal based on an output of said modulator means,
   said pre-processing means carrying out the pre-processing so that I-axis and Q-axis data, supplied to said modulator means from said pre-processing means, have an identical symbol in succession at parts corresponding to leading and trailing edges of the burst signal, so as to suppress generation of unwanted waves in said output means.

2. The $\pi/4$ shift quadrature phase shift keying modulator as claimed in claim 1, wherein said output means includes switching means for turning the output of said modulator means ON/OFF responsive to the burst.

3. The $\pi/4$ shift quadrature phase shift keying modulator as claimed in claim 1, wherein said pre-processing means includes converter means for converting the input transmitting code sequence to parallel transmitting codes a predetermined amount at a time.

4. The $\pi/4$ shift quadrature phase shift keying modulator as claimed in claim 3, wherein said pre-processing means further includes:
   a first circuit, coupled to said converter means, detecting timings of the leading and trailing edges of the burst signal; and
   a second circuit, coupled to said first circuit, carrying out a logical operation on the transmitting codes so that the transmitting codes are converted into values such that the I-axis and Q-axis data supplied to said modulator means from said pre-processing means have same symbol in succession at parts corresponding to the leading and trailing edges of the burst signal.

5. The $\pi/4$ shift quadrature phase shift keying modulator as claimed in claim 3, wherein said modulator means includes:
   an operation part, coupled to said converter means, carrying out a predetermined operation on the transmitting codes received from said converter means and I-axis and Q-axis data of a signal point arrangement of one timing before received from said pre-processing means, so as to obtain the I-axis and Q-axis data of a signal point arrangement of a present timing which is shifted by $\pi/4$ from the signal point arrangement of one timing before;
   converter part, coupled to said operation part, converting the I-axis and Q-axis data of the signal point arrangement of the present timing obtained from said operation part into analog baseband modulating signals of I-channel and Q-channel; and
   4-phase phase modulator, coupled to said converter part, subjecting the I-channel and Q-channel baseband modulating signals from said converter part to a 4-phase phase modulation to output the output of said modulator means.

6. The $\pi/4$ shift quadrature phase shift keying modulator as claimed in claim 5, wherein said pre-processing means includes a circuit generating an odd/even judging signal (OE) which is "1" for a normal signal point arrangement of the quadrature phase shift keying and "0" for $\pi/4$ shift signal point arrangement of the $\pi/4$ shift quadrature phase shift keying.

7. The $\pi/4$ shift quadrature phase shift keying modulator as claimed in claim 6, wherein said operation part includes a circuit obtaining the signal point arrangement of the present timing based on the following Table, and said pre-processing means includes a circuit carrying out a process on the transmitting codes such that a transmitting code $(X_K, Y_K)$ is set to (0, 0) if the odd/even judging signal (OE) is "1" in the Table and the transmitting code $(X_K, Y_K)$ is set to (1, 0) if the odd/even judging signal (OE) is "0" in the Table, where $(I_K, Q_K)$ denotes the I-axis and Q-axis data of the present timing, $(*I_K, *Q_K)$ denotes inverted data of $(I_K, Q_K)$, $(I_{K-1}, Q_{K-1})$ denotes the I-axis and Q-axis data of one timing before, and $(*I_{K-1}, *Q_{K-1})$ denotes inverted data of $(I_{K-1}, Q_{K-1})$.

TABLE

| (OE, $I_{K-1}$, $Q_{K-1}$) | ($X_K$, $Y_K$) +$\pi$/4 0 0 | 3$\pi$/4 0 1 | −3$\pi$/4 1 1 | −$\pi$/4 1 0 |
| --- | --- | --- | --- | --- |
| 0 $I_{K-1}$ $Q_{K-1}$ | 1, $I_{K-1}$, $Q_{K-1}$ | 1, *$Q_{K-1}$, $I_{K-1}$ | 1, *$I_{K-1}$*$Q_{K-1}$ | 1, $Q_{K-1}$, *$I_{K-1}$ |
| 1 $I_{K-1}$ $Q_{K-1}$ | 0, *$Q_{K-1}$, $I_{K-1}$ | 0, *$I_{K-1}$, *$Q_{K-1}$ | 0, $Q_{K-1}$*$I_{K-1}$ | 0, $I_{K-1}$, $Q_{K-1}$ |

8. The $\pi$/4 shift quadrature phase shift keying modulator as claimed in claim 7, wherein said pre-processing means further includes:
   a first circuit, coupled to said converter means, detecting timings of the leading and trailing edges of the burst signal; and
   a second circuit, coupled to said first circuit, carrying out a logical operation on the transmitting code ($X_K$, $Y_K$) based on the odd/even judging signal (OE) so that the transmitting code ($X_K$, $Y_K$) is converted into values such that the I-axis and Q-axis data supplied to said modulator means have the identical symbol in succession at parts corresponding to the leading and trailing edges of the burst signal.

9. The $\pi$/4 shift quadrature phase shift keying modulator as claimed in claim 1, wherein said pre-processing means carries out the pre-processing so that the identical symbol continues in succession at least twice for I-axis and Q-axis data at parts corresponding to the leading and trailing edges of the burst signal.

* * * * *